United States Patent
Manchanda et al.

(10) Patent No.: US 6,839,724 B2
(45) Date of Patent: Jan. 4, 2005

(54) METAMODEL-BASED METADATA CHANGE MANAGEMENT

(75) Inventors: Arun Manchanda, Foster City, CA (US); Ron Gonzalez, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 83 days.

(21) Appl. No.: 10/418,883

(22) Filed: Apr. 17, 2003

(65) Prior Publication Data

US 2004/0210607 A1 Oct. 21, 2004

(51) Int. Cl.$^7$ ................................................ G06F 17/30
(52) U.S. Cl. ............................... 707/203; 707/2; 707/3
(58) Field of Search ............................... 707/1, 2, 3, 4, 707/5, 6, 7, 8, 9, 10, 100, 101, 102, 104.1, 200, 201, 202, 203; 345/853

(56) References Cited

U.S. PATENT DOCUMENTS

| | | | |
|---|---|---|---|
| 6,628,312 B1 * | 9/2003 | Rao et al. ................... | 345/853 |
| 6,691,120 B1 * | 2/2004 | Durrant et al. ............. | 707/100 |
| 6,763,357 B1 * | 7/2004 | Deshpande et al. ......... | 707/101 |
| 6,768,986 B2 * | 7/2004 | Cras et al. .................... | 707/2 |
| 6,772,166 B1 * | 8/2004 | Hildreth ..................... | 707/102 |

OTHER PUBLICATIONS

Oracle Corporation, Jean–Pierre Dijcks, "Oracle 9i Warehouse Builder," Architectural White paper, Jan. 2003, pp. 1–16.
Oracle Corporation, Jean–Pierre Dijcks "Integrated ETL and Modeling, Oracle9i Warehouse Builder," An Oracle White Paper, Feb. 2003, pp. 1–30.

* cited by examiner

Primary Examiner—Diane D. Mizrahi
Assistant Examiner—Yicun Wu
(74) Attorney, Agent, or Firm—Hickman Palermo Truong & Becker LLP; John D. Henkhaus

(57) ABSTRACT

A framework is provided for management of models. Management of data models or other types of models includes model change comparison and change implementation. For example, in the context of data warehouse models, model components and their process interactions are captured in a form such that different versions of a model can be automatically compared and any changes between versions determined. The framework provides the capability of capturing a model definition down to the level of an individual object and the semantics and relationships of each object. A model is represented and stored as a set of (1) unique object identifiers, (2) object metadata signatures that represent the semantics of objects, and (3) object relationships. Such model information can be stored in a relational database, against which a query, such as an SQL (Structured Query Language) query, can be executed to determine whether two models differ.

39 Claims, 5 Drawing Sheets

TABLE 300

| UOID ⟨302 | SIGNATURE ⟨304 | RELATIONSHIP ⟨306 | ASSOC_UOID ⟨307 | ROLE n ⟨308 | ROLE m ⟨310 | ⟨312 |
|---|---|---|---|---|---|---|
| UOID 1 | S1 | PARENT-CHILD | UOID$_a$ | R$_{1a}$ | R$_{a1}$ | ... |
| UOID 1 | S1 | WITHIN COMP. | UOID$_b$ | R$_{1b}$ | R$_{b1}$ | ... |
| UOID 2 | S2 | OUTSIDE COMP. | UOID$_a$ | R$_{2a}$ | R$_{a2}$ | ... |
| ... | ... | ... | | ... | ... | ... |
| UOID n | S$_n$ | R$_{type}$ | UOID$_m$ | R$_{nm}$ | R$_{mn}$ | ... |

FIG. 3

METAMODEL-BASED METADATA CHANGE MANAGEMENT

FIELD OF THE INVENTION

The present invention relates generally to database and data warehouse systems and, more specifically, to techniques for managing changes to data models and data flow models.

BACKGROUND OF THE INVENTION

Data Warehouse Models

A data warehouse is a consolidated view of enterprise data, optimized for reporting and analysis. Basically it's an aggregated, sometimes summarized copy of transaction and non-transaction data specifically structured for dynamic querying, analysis and reporting.

The Oracle Warehouse Builder (OWB) product, available from Oracle Corporation of Redwood Shores, Calif., is a productivity tool for databasedevelopers, database application developers, and data warehouse managers and developers. The product helps in the design, build and maintenance of data warehouses. A key component of OWB is a repository, which is a set of tables stored in a database. The repository stores a data warehouse developer's work, which includes the metadata that defines a data warehouse model (for e.g. relational model, dimensional model, ETL model, and process flow model). The metadata includes the description of the objects that can be populated or queried, not the objects themselves, and descriptions of run-time execution processes associated with such objects.

Generally, a model defines components, such as databases, schema, transformations, functions, procedural code, and the like, and the schema according to which the model components interact. The various kinds of models can be described in one unified model itself, referred to as a Meta Meta Model, which is a model to describe all the other models. Model components may be described, for example, in the Universal Modeling Language (UML). Model components can comprise objects and associations, and objects can be defined with information such as object class, attributes, and relationships. For example, an actual table holding data is an instance of a table component, which can be described in UML with table class owning column class and table class owning constraints class, which has associations with columns.

An ETL (Extraction, Transformation, and Loading) model is a common form of a data warehouse model. Generally, an ETL model describes the extraction, transformation and loading of data from a source database to a target database, with transformations to be applied before loading. In an ETL model, each action is considered a component of the model. For example, data flow from a source database employee table to a target database employee table with bonus transformation would be an ETL model. The process flow model would include re-routing of different process depending upon some conditions. For example, a corresponding process flow model may be, if loading in target fails, send email to administrator, and if it passes, then keep success log.

Models of any form, especially data warehouse models, can be significantly complex. Models can be used as templates for construction of a database. Models can usually be visualized as a tree consisting of many interrelated branches and nodes. A tool such as OWB provides a mechanism for graphically building a model, from which a database can be constructed. Basically, anything can be modeled, for non-limiting examples: processes, analytical applications, files, web services, data manipulation schedules, reports, and the like. For example, a dimensional or data model may describe fact, dimension and interface tables, cubes, relationships, and the like. For another example, a data warehouse model may describe a specific star schema or snowflake schema. For yet another example, a process flow model may describe a source database, a target database, mappings and schedules. For example, an ETL mapping may include a generic Maplet routine. Furthermore, models can be nested.

Tracking and managing changes to data and application models is a difficult and complex challenge. This challenge is especially prevalent in the context of data warehouse models. Data warehouse models, such as ETL (Extraction, Transformation, and Loading) mappings, process flows, and dimensional, relational and other data models, tend to be quite complex. Massive amounts of information are required to build and represent such models. Furthermore, data warehouse models are often ever-evolving and, therefore, ever-changing entities. Thus, one of the most demanding tasks of a data warehouse developer is to keep track of changes made to various components in data warehouse models.

Today, users typically manage changes to such models (1) manually, in the native system in which the modeling is constructed; or (2) in external data storage systems, such as database or versioning systems, which are different from the native modeling system. External systems typically store model representations in a textual or binary format. However, conversion of a model that is represented in a character based or binary format poses significant challenges and is often a tedious, inefficient, error-prone process. Such challenges are exacerbated by the absence of a mechanism that can accurately determine differences between two models or two versions of a model.

Without an automated change management mechanism, one has no way of knowing how model A differs from model B or how version 1 of model A differs from version 2 of model A, except by maintaining manual records of changes to the model. Such a shortcoming stems from the fact that external systems do not understand the semantics of a data model. For example, some current approaches to tracking changes to models simply rely on timestamps to indicate whether portions of a model have changed, without any way to know whether or how model semantics may have changed. Semantics provide meaning and context to data. Semantics are often implemented or actualized in the form of metadata. Furthermore, using timestamps to indicate a change can produce inaccurate results. For example, if a model is changed from version A to version B and back to version A, a simple timestamp mechanism would indicate that the model has changed when, in fact, the model has not substantively changed.

Upgrading a model instance based on changes to an associated model is an even more daunting task than tracking changes to a model because a user must determine from the tracked changes, the particular portions of a model instance that need upgrading and redeployment. Upgrading a model instance is also a manual process which tends to be labor-intensive, complex and error-prone. For example, assuming a telecommunications industry specific data warehouse is modeled and deployed at many installation sites, then changes to a portion of the data warehouse model needs to applied to all the installation sites. This can be a labor intensive and error prone manual process, depending upon the unit of change.

Based on the foregoing, there is a clear need for a mechanism for tracking changes to data models that reduces the burden on a model developer and administrator. There is a further need for a mechanism for generating a patch/upgrade that can be applied to multiple model installation sites.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 illustrates an example table containing columns for elements of lightweight model information.

DETAILED DESCRIPTION

A method and system are described for managing changes to data models. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

A framework is provided for management of models. Management of data or information models typically includes comparison of versions of models to determine differences between the versions, and implementation of changes that were made to one version into another version. For example, in the context of data warehouse models, model components and their process interactions are captured in a form such that different versions of a model can be automatically compared and any changes between versions determined. The framework provides the capability of capturing a model definition down to the level of an individual object and the semantics and relationships of each object.

According to one aspect, a model is represented and stored as a set of (1) unique object identifiers, (2) object metadata signatures that represent the semantics of objects, and (3) object relationships. Such model information can be stored in a relational database, against which a query, such as an SQL (Structured Query Language) query, can be executed to determine whether two models differ. Historical metadata that represents the state of the model at a point in time is referenced to determine the nature of any model differences that are identified. Such differences can be encapsulated into a delta object, which can be applied to a model instance to cause the instance of the model to reflect the differences reflected in the delta object.

The techniques described herein provide a framework to represent any form of model of unlimited complexity in a generalized, repeatable format such that a "snapshot" of models can be taken, models can be compared, differences determined, and identified changes implemented into instances of a model.

System for Managing Changes to a Data Model

Figure 1:
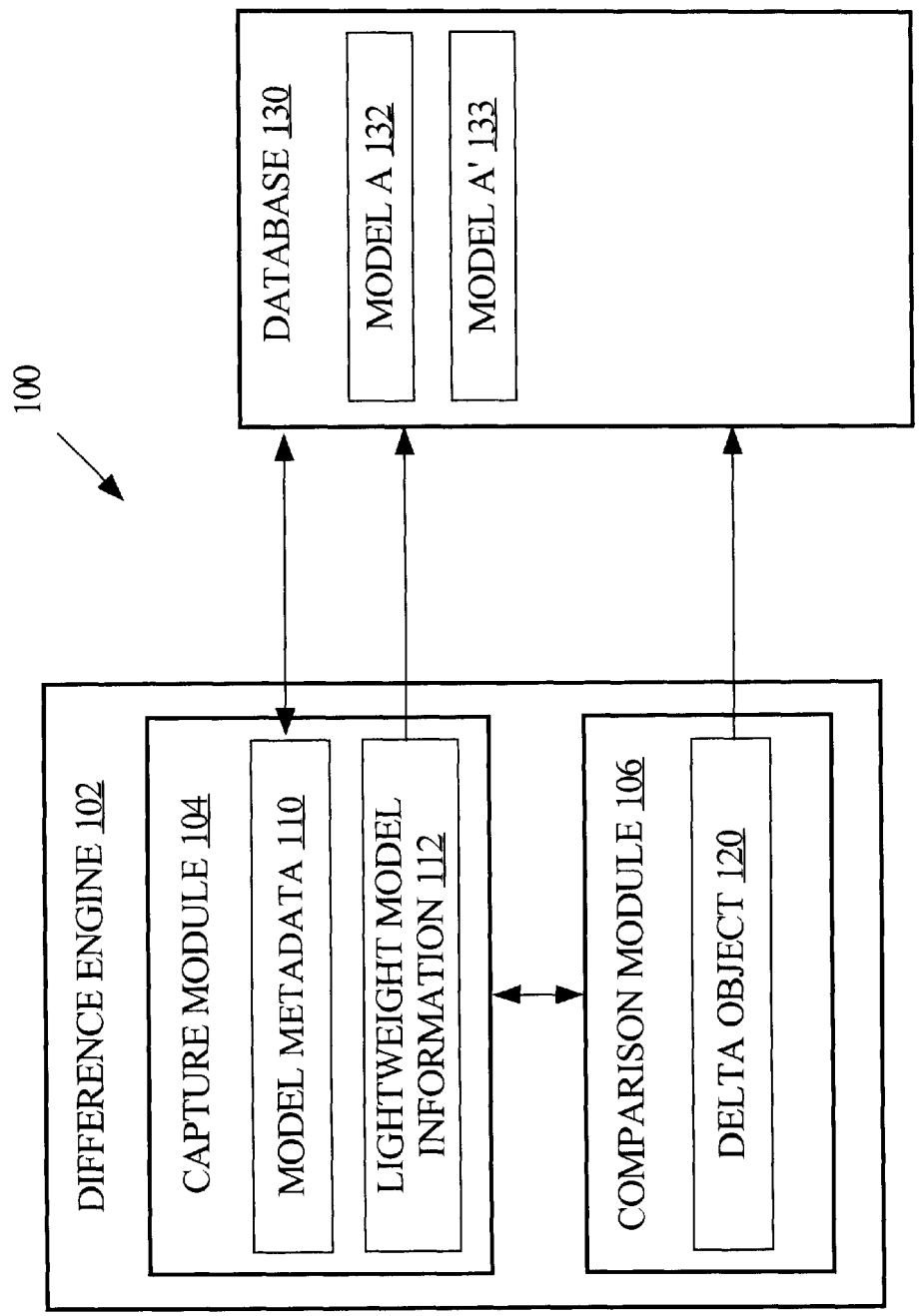
FIG. 1 is a block diagram that illustrates a system for managing changes to a data model.

FIG. 1 is a block diagram that illustrates a system 100 for managing changes to a data model. System 100 includes a difference engine 102 communicatively coupled to a database 130.

Database 130 is any conventional database with a related database management system. Database 130 is a repository for storing any number of models. Storing models, such as Model A 132 and Model A' 133, may include for example, storing descriptions and definitions of (1) model components; (2) component objects; (3) object relationships; (4) object metadata that represents the semantics of the objects, components and model; and any other data that constitutes a data model. In addition, other data that is generated by the difference engine 102 is stored in database 130, which is described in detail in reference to difference engine 102.

Difference engine 102 includes a capture module 104 and a comparison module 106. Difference engine 102 comprises one or more computer programs or other software elements for implementing functions described herein. Difference engine 102 may be integrated into a larger application, or may stand alone as a separate application. Difference engine 102 is communicatively coupled to database 130 such that engine 102 can retrieve data from and store data in database 130.

Capture module 104 includes, at times while processing a given model, model metadata 110. Model metadata 110 includes the metadata associated with the given model, or a subset of a model. Model metadata 110 includes the metadata associated with each component and object of the given model or subset and represents the semantics of the model.

Model metadata 110 is extracted from database 130, for example, from Model A 132 or Model A' 133, for processing by capture module 104 and comparison module 106. Furthermore, model metadata 110 may be stored back in database 130, in a format suitable for further analysis and processing as part of a comparison process that is described below. Model metadata 110 may be stored in database 130 separate from the model from which it originates, and may be stored in a data container such as a conventional data table. Whether model metadata 10, for the given model is stored alone in a table or other data container, or stored with metadata from other models, is not important. For a non-limiting example, model metadata 110 that is associated with a given model object may be stored in a table with other information relating to the given object, such as in column 312 of table 300 of FIG. 3. However, the complete model metadata 110 for a given object may be stored together in bulk, that is, not necessarily disintegrated at the object level.

Furthermore, model metadata 1110 may be used for model roll-back purposes. That is, a user can undo a series of changes made to a model subsequent to capture of model metadata 1110, thus providing a roll-back to the state of the model at the time of capture of the model metadata 1110.

Modern modeling systems are object-oriented systems. Thus, an object graph can be drawn based on metamodels of a model. A metamodel comprises information about a model and captures or represents the model's semantics, which gives the model components meaning and context. In other words, model components are a realization of the semantics of a model. For example, a relational table's semantics comprises its name, description, definitions of the columns it contains, names of the columns, and the like. Furthermore, metamodel information is used by some development tools to convert a graphical model to code in a modeling language, such as UML. A model can be categorized into components, which constitute a set of linked objects. Hence, a data warehouse or other model can be described in terms of objects and their associations to one another.

Once model metadata 110 is retrieved from database 130, it is processed by capture module 104 to generate lightweight model information 112. Lightweight model information 112 ("model information") is derived from the model metadata 110, and is a unique form in which to represent a model. Model information 112 represents a model, or a specified portion of a model, using the following three elements: (1) universal object identifier ("UOID"); (2) metadata signature; and (3) relationship(s). For example, FIG. 3 illustrates an example table 300 containing columns for each of these elements. Reference is made to table 300 throughout the following description; however, storage of model information 112 is not limited to storage in a table such as table 300. Capture module 104 generates the model information 112, which can be stored in database 130 or elsewhere.

In processing a given model, such as Model A 132, a UOID is generated to uniquely identify each object in the given model. The format in which the UOID is generated is unimportant, as long as a UOID uniquely identifies each model object. Column 302 of table 300 of FIG. 3 illustrates that a unique object can have multiple records in the model information 112. Each record or row represents a unique three-tuple containing the elements of model information 112.

Any or all elements of an object that contribute to the semantics of the model, which represent how the model works, are conglomerated and reduced into a single metadata signature. Hence, the metadata signature represents the semantics associated with a given object in the context of the model component of which it is part. In an embodiment, the metadata signature is computed with a hash function. Generally, object metadata is the input to the hash function and a metadata signature is output from the hash function. Therefore, any difference in the metadata at two points in time is reflected in the output of the hash function. Comparing two signatures for the same object can quickly indicate whether the object metadata and, therefore, the object semantics, have changed in the intervening time between the two reference points.

The hash function used to compute an object signature may vary from implementation to implementation, and the techniques described herein are not limited to any particular mechanism for generating a signature. The function should be necessarily precise as to indicate any change in the input metadata, and should be repeatable so that a comparison of different outputs from the function produces accurate results. In a preferred embodiment, the hash function is a one-way hash function. However, according to one embodiment, the hash function is a two-way function so that a given metadata signature that is output by the function can be deconstructed via the function to determine what the input to the function was with respect to the given signature.

In an implementation, the metadata signature is a fixed size 32 character hexadecimal number. However, the signature is not limited to such an implementation and form. Furthermore, it is possible that different model objects with different UOIDs could have the same metadata signature.

In one embodiment, object signatures are aggregated into a model signature that captures the semantics of the entire model. Hence, comparison of aggregated model signatures for two versions of a model may be used as a first phase comparison process, in order to quickly determine whether one version varies from another. As a second phase, the object level comparison, as described herein, can be used to "drill down" through the model to determine what and how objects have changed. However, such a process may not be optimal with respect to performance. Methods of aggregation may vary from implementation to implementation and the techniques described are not, therefore, limited to any particular method of aggregation of object signatures. For example, individual object signatures may be used as input to an aggregation hash function. For another example, a repeatable algorithm may be used to characterize model objects and to concatenate object signatures into an aggregated model signature.

Using the techniques described above, any complex model's semantics are reduced to a set of UOIDs and associated metadata signatures. Each unique object is identified by its UOID and its signature, which is a unique pair of data items for each object. Table 300 of FIG. 3 illustrates the fact that two records for the same object, identified therein as "UOID 1", have the same metadata signature in signature column 304. Capturing the metadata signatures of component objects captures the semantics of a given model component. A collection of the object signatures for all the model objects captures the semantics of the complete model. Non-semantic information, such as object descriptions or comments, are not necessarily captured by capture module 104, for such information may be considered unimportant to management of model changes.

Different users may define semantics of a same object class differently, for example, including different attributes in instances of the same object. Therefore, in one embodiment, the level at which a model is captured is specifiable. For example, a user may specify a subset of the model components or a subset of objects for capture and associated generation of lightweight model information 112. Hence, the capture process is efficient in that unnecessary or unwanted computations are avoided.

Another piece of information that is extracted or derived from a given model is the relationship(s) associated with each object. Since a model generally consists of a set of objects and relationships between objects, such relationships are captured as part of the capture process performed by capture module 104. Thus, object relationships are included in the model information 112.

Models can be visualized as a hierarchical graph of objects. In an embodiment, an object is classified to have one of three possible relationships with another object in a model: (1) a parent-child relationship, whereby the parent object "owns" the child object; (2) a relationship, other than a parent-child, within a given model component; and (3) a cross-component relationship, whereby the related objects are related across model component boundaries. For an example of a parent-child relationship, a cube A is a parent of a fact table A, therefore fact table A does not exist without cube A. For a given object, the relationship information of model information 112, such as that found in relationship columns 306–310 of table 300, includes an identifier of a related object, the nature of the relationship and the respective roles the objects play in relation to each other.

In an embodiment, the relationship(s) of interest can be specified, for example, by a user. Thus, not all of the relationships of a given object are necessarily captured in the model information 112.

Relationship column 306 of table 300 of FIG. 3 illustrates that each record in the table contains a different relationship. Again, each record is a unique three-tuple representing a particular object and its associated semantics and a relationship. Thus, UOID 1 is stored multiple times in table 300, with the same unique signature in signature column 304, but with different relationships per record. That is, every record has a different relationship, and there are as many records for a given object as there are relationships associated with the object. For example, UOID 1 is shown to have a "parent-child" relationship with one object (i.e., object a) and a "within component" relationship with another object (i.e., object b).

Column 307 of table 300 includes related or associated object UOIDs, referred to as ASSOC_UOID. Column 307 includes, for a given object, the UOID of a related object. For example, since UOID 1 is related to objects a and b, the presence of these relationships is depicted in column 307 as $UOID_a$ and $UOID_b$, respectively.

Furthermore, in one embodiment, the roles objects play with respect to each other is included in the lightweight model information 112. For example, role column 308 illustrates that UOID 1 plays a role with respect to object a, such as a parent role, depicted as $R_{1a}$; and column 310 illustrates that object a plays a role with respect to UOID 1, such as a child role, depicted as $R_{a1}$. Thus, enough relationship information is embedded in table 300 to allow difference engine 102 (FIG. 1) to determine the nature of a relationship change between versions of a model by comparing and analyzing relationship types, as in column 306, and relationship roles, as in columns 308 and 310.

Once the model information 112 is generated, it can be stored in database 130. In addition, model information associated with one object, component or model can be passed to the comparison module 106 for comparison with model information associated with another object, component or model. Comparison module 106 is configured to facilitate execution of a process of comparing two sets of model information, such as with two different versions of a model. In one embodiment, once the model information is stored in a database table such as table 300 of FIG. 3, a standard database query can be run against the table to compare model information 112. For example, a SQL or PL/SQL query could be run against the table storing the model information 112, thereby providing a scalable comparison process.

The manner in which models, represented as described above, are compared may vary from implementation to implementation, and the techniques described herein are not limited to any particular mechanism for comparing such models.

One such implementation of a model comparison routine is provided in Appendix A, and is based on the following context. Assuming two model snapshots to be compared, A and B, in one embodiment, a difference graph is computed and results are stored in a table. There are three primary actions associated with computation of differences between models or model versions:

A−B (to determine objects only found in A);
B−A (to determine objects only found in B);
A=\B (to determine objects found in A and B, which have different semantics (e.g., metadata signatures)).
Logic flow is as follows:
1. There are two tables, SourceComponent and TargetComponent, which store contents of source and target snapshots, respectively.
2. A procedure findDelta is used to compute (A−B) and (B−A).
3. A procedure findUpdate computes the model updates, that is, all matched objects with different semantics, or metadata signatures.

The findDelta and findupdate procedures constitute an example comparison query, implemented as illustrated in Appendix A.

Such a query determines whether lightweight model information 112 for respective models or portions of models ("comparees") is different. For example, a current version of a model is compared to a previous version or "snapshot" of the same model. Different metadata signatures associated with the objects that are constituent to the comparees indicate an object change. UOIDs found in one comparee but not another indicate that an object has been added or deleted. Relationships associated with a given object, that are found in one comparee but not another, indicate that the relationships for the given object have changed. Furthermore, the nature of the relationship may be different in the comparees, which is determinable by comparing corresponding object relationship information. In one embodiment, such determined differences form the basis of a comparison report.

Significantly, a model comparison performed by comparison module 106 does not require a node-by-node tree comparison, as with prior approaches. The techniques described herein provide a framework to break down the complexity of nodal graphs into, essentially, lists. Therefore, model comparison processes become simpler and more efficient with the object information captured, structured and stored as described, in relation to the prior approaches of node-by-node tree comparisons. Model change analysis is a linear-time operation when using the described techniques instead of an exponential-time operation when using prior model comparison techniques. Therefore, the described techniques are significantly more scalable than the prior techniques.

Once changed objects are identified by comparison module 106, comparison module 106 further determines how the relevant objects have changed, according to an embodiment. To make a determination as to how a particular model object has changed, comparison module 106 refers to the unprocessed model metadata 110 that is associated with the model, which represents a point in history for the model of which the particular object is part. For example, comparison module 106 determines that a given object has a different metadata signature. Next, comparison module 106 determines, based on associated model metadata 110, what caused the change in metadata signature. That is, comparison module 106 determines how the object metadata changed, such as the nature of the change, by comparing model metadata 110 for each of the comparees.

In an embodiment, once differences between two or more models or model history points are determined, an action plan can be generated to implement the changes to existing deployed models, e.g., model instances based on the model. Hence, a user can upgrade a deployed model in an automatic and efficient manner by applying the relevant action plan. For example, Model A 132 can be upgraded to Model A' 133 at any desired points of deployment, or instances, of Model A 132.

In an embodiment, application of an action plan to a given model is facilitated through generation and use of a delta object 120. For example, an action plan can be built based on Model A 132 and Model A' 133. Comparison module 106 can generate a delta object 120 for any comparison that it has performed based on model metadata 110 for the respective Model A 132 and Model A' 133, and can store a delta object 120 in database 130. Delta object 106 represents the differences between the two comparees, in the form of one or more objects. A delta object 106 is likened to an application patch, which can be executed or applied to an existing model instance to update the state of the instance. For example, a single customer user may have hundreds or thousands of instances of a given model deployed in one or more databases, and can utilize a delta object 120 to simply and efficiently update any or all of such instances.

Furthermore, application of an action plan using a delta object 120 does not affect any changes that may have previously occurred to the target model that are unique to the target model. That is, any unique instance-level changes are not necessarily overridden through application of a delta object 120 to that instance. In one embodiment, potential conflicts between an existing instance and a delta object 120 are identified to a user for resolution.

Method for Managing Changes to a Data Model

Figure 2A:
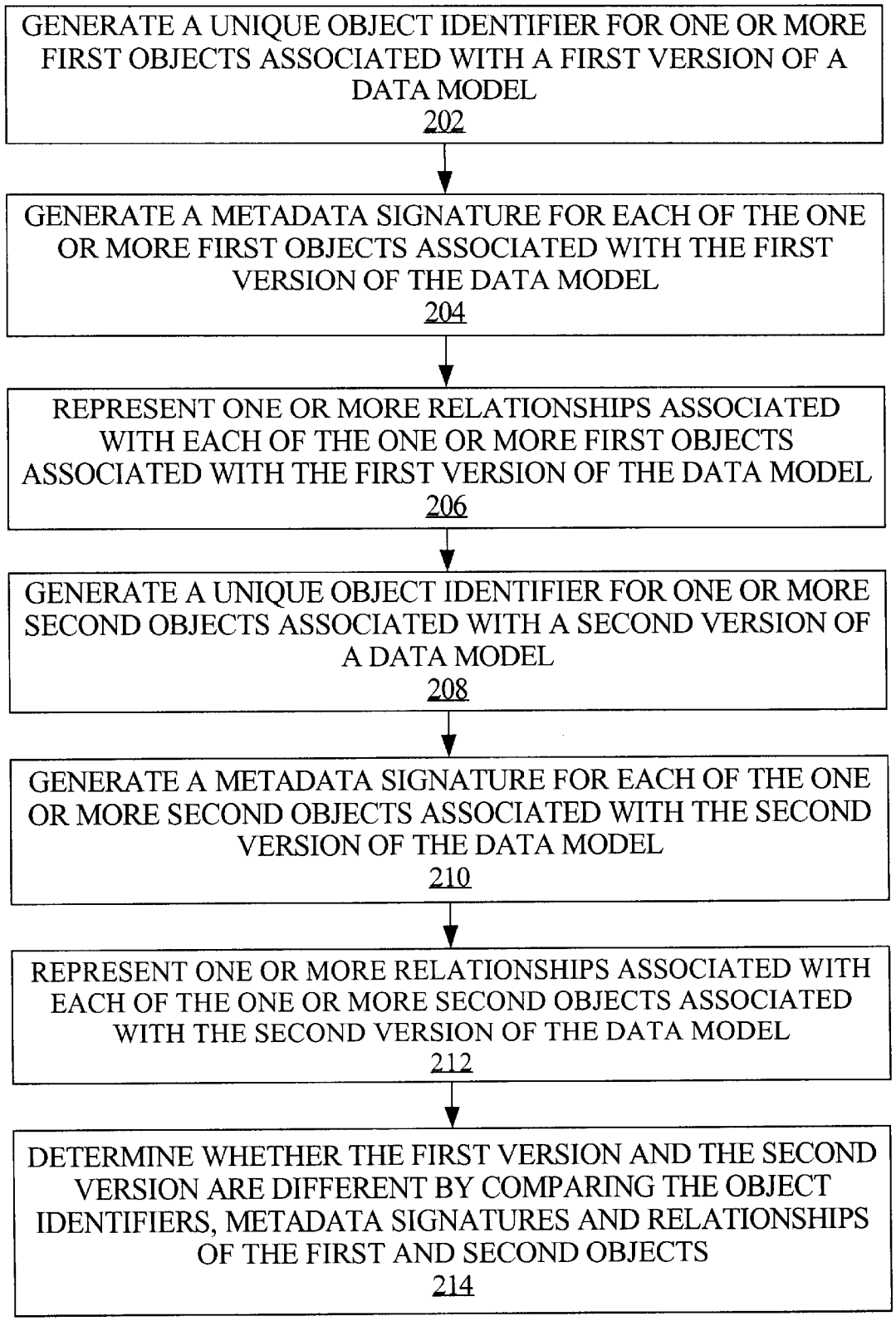
FIG. 2A is a flow diagram that illustrates a method for managing changes to a data model.
Figure 2B:
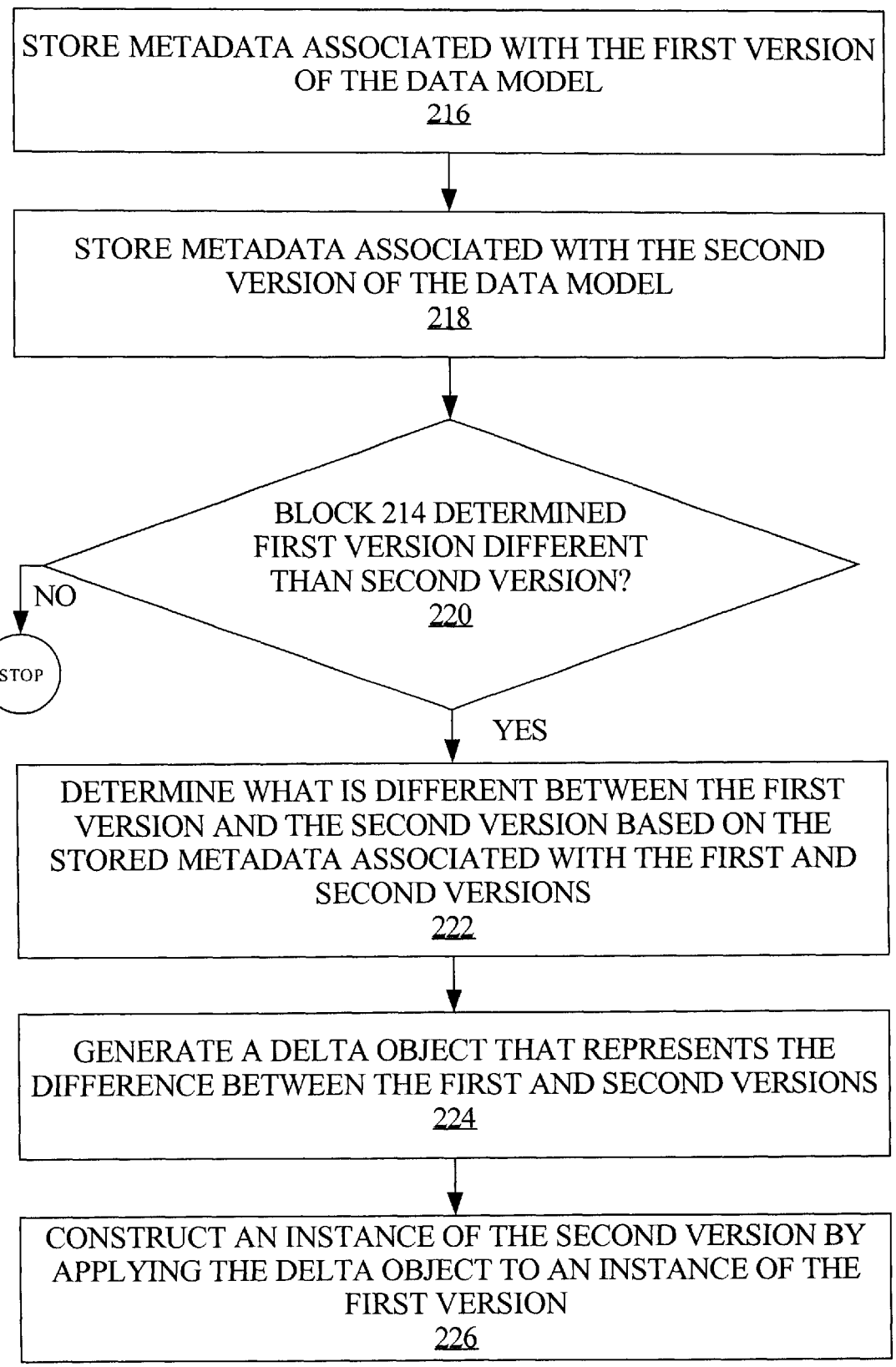
FIG. 2B is a flow diagram that illustrates a method for managing changes to a data model.

FIG. 2A is a flow diagram that illustrates a method for managing changes to a data model. FIG. 2B is a flow diagram that illustrates an optional method for managing changes to a data model. The method of FIG. 2B, if implemented, is performed in addition to the method of FIG. 2A. Further, the steps illustrated in blocks 216–226 of FIG. 2B are not necessarily performed after the steps illustrated in blocks 202–214 of FIG. 2A. For example, optional block 216 may be performed before blocks 202–206 and optional block 218 may be performed before blocks 208–212.

At block 202, a unique object identifier is generated that uniquely identifies each of one or more objects that are associated with a first version of a data model, referred to herein as first objects. For example, object identifiers are generated for each object of Model A 132 (FIG. 1) that is considered relevant to the current process. The method of generating the identifier is unimportant, as long as each different object from two or models being managed are uniquely identified by its identifier, globally within the system and, preferably, globally across any system and unique across time, space and system dimensions.

At block 204, a metadata signature is generated for each of the one or more first objects associated with the first version of the model. For example, metadata signatures are generated for each object of Model A 132 (FIG. 1) that is considered relevant to the current process. A metadata signature represents the semantics of a given object. Semantics of a model represent how the model functions or operates, in a run-time configuration. Semantics of an object represent how the object functions and, effectively, provide meaning to the data associated with the object. Thus, a single key, its metadata signature, defines an entire object structure. For example, an entire database table structure may be represented by a single metadata signature, which changes as the table structure changes.

In an embodiment, the metadata signature is computed using a hash function. An object's metadata that represents its semantics is input into a hash function, which outputs a metadata signature for the object. Any semantic change to the object results in a change of input for the hash function and produces a different signature. Requirements of a suitable hash function are described in reference to FIG. 1.

Model objects do not typically function independently, but rather function by interacting with related objects. At block 206, one or relationships associated with each of the one or more first objects associated with the first version of the model are represented. A relationship is between two objects. For each model object being processed, the objects related to the given object are represented, as well as the nature of the relationship. For example, an object A may be represented as being a parent object to an object B. In reference to the query of Appendix A, the nature of object relationships are referred to as roles.

At blocks 208 and 210, object identifiers and metadata signatures are generated for one or more objects that are associated with a second version of the model, referred to herein as second objects. Furthermore, at block 212, the relationships associated with each second object are represented, similarly as with block 208 for the first objects. For example, the second objects are objects associated with Model A' 133 (FIG. 1). At this point in the process, each of the first and second versions of the model are captured and uniquely coded for efficient and precise comparison. That is, the lightweight model information 112 (FIG. 1) is generated for both Model A 132 and Model A' 133.

At block 214, whether the first and second versions of the data model are different is determined. This determination is made by comparing the object identifiers, metadata signatures and relationships of the first objects associated with the first version of the model with the second objects associated with the second version of the model. For example, comparison module 106 (FIG. 1) manages execution of a SQL statement against one or more tables that store the information generated or represented in block 202–212. FIG. 3 illustrates a data table 300 that may be built based on the various information referred to in blocks 202–206 for a first model and/or block 208–212 for a second model, or a second version of the first model. Tables such as the example table 300 can be joined and compared at block 214, via a SQL statement.

In reference to the optional method of FIG. 2B, which depicts embodiments of the invention, at blocks 216 and 218 metadata associated with the first and second versions of the model are stored. The metadata stored at blocks 216 and 218 is "raw" metadata extracted from the model information stored in database 130 (FIG. 1), such as from Model A 132 and Model A' 133. Such metadata is raw in that it is not processed into lightweight model information 112 (FIG. 1), such as at block 202–212.

Decision block 220 references the determination made at block 214. If block 214 determined that the first version is different than the second version, then what is actually different between the first and second versions is determined at block 222. The determination of block 222 is based on the respective metadata stored at blocks 216 and 218. For example, model metadata 110 (FIG. 1) for Model A 132 and Model A' 133 is referenced, particularly for the object(s) that have been determined to have changed, to determine in what manner these object(s) have changed. A comparison is performed on the respective model metadata for each model, and detailed changes to such metadata is determined therefrom.

At block 224, a delta object such as delta object 120 (FIG. 1) is generated. The delta object represents the differences between the first and second versions, which were determined at block 222. Furthermore, at optional block 226, an instance of the second version of the model is constructed. For example, an instance may be constructed in response to a user command. The instance is constructed by applying the delta object, which was generated at block 224, to an instance of the first version. The instance of the first version is thereby converted to an instance of the second version.

A practical scenario may include, for example, (1) a user making changes to a global model template; (2) determining the changes made by using the techniques described herein; (3) having a delta object generated to represent the changes made to the model template, using the techniques described herein; and (4) applying the delta object to one or more deployed instances of the model template to update the deployed instances.

Hardware Overview

Figure 4:
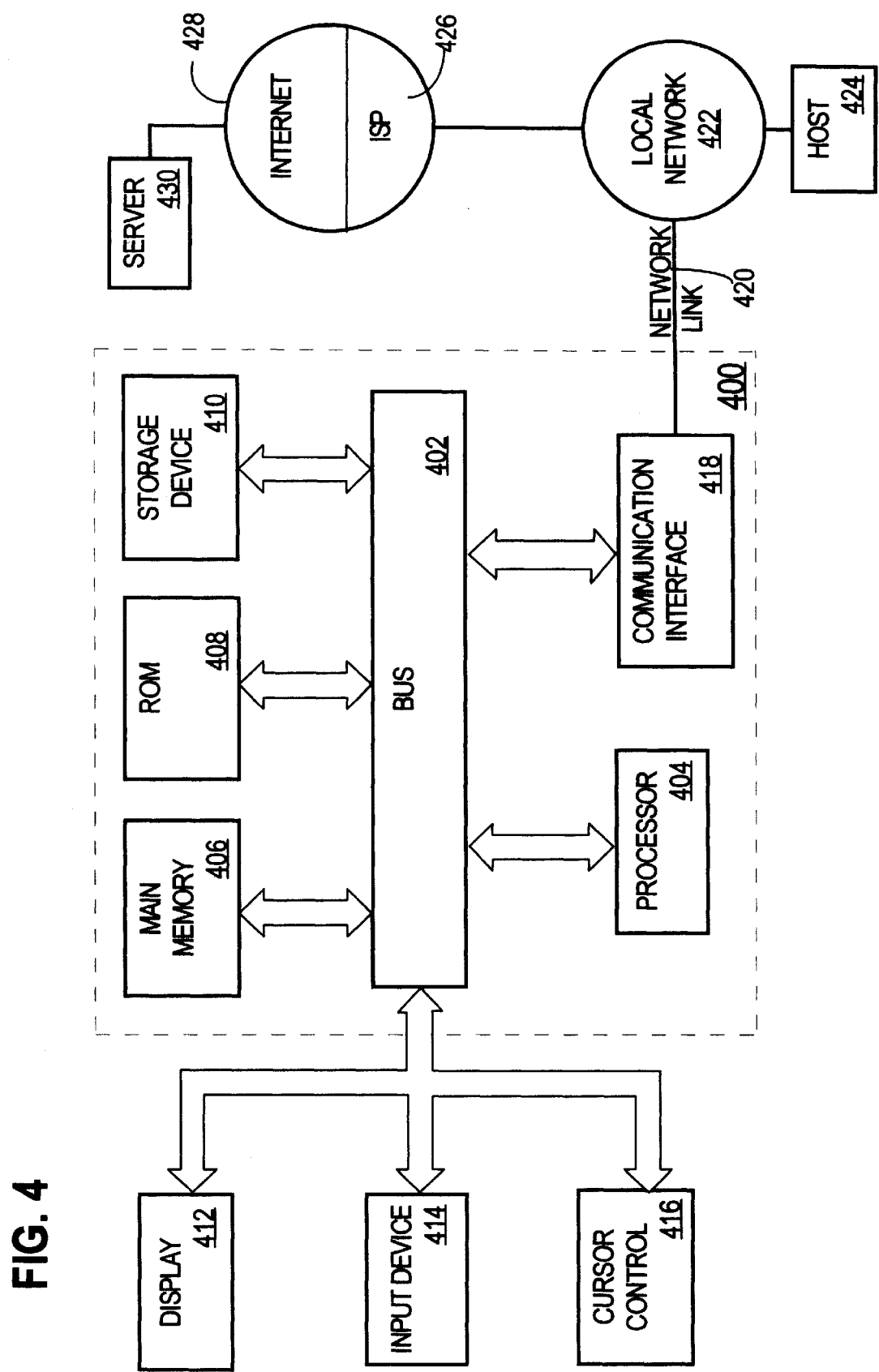
FIG. 4 is a block diagram that illustrates a computer system upon which an embodiment of the invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk, optical disk, or magneto-optical disk, is provided and coupled to bus 402 for storing information and instructions.

Computer system 400 may be coupled via bus 402 to a display 412, such as a cathode ray tube (CRT) or a liquid crystal display (LCD), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical, magnetic, or magneto-optical disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

Extensions and Alternatives

Alternative embodiments of the invention are described throughout the foregoing description, and in locations that best facilitate understanding the context of the embodiments. Furthermore, the invention has been described with reference to specific embodiments thereof. It will, however, be evident that various modifications and changes may be made thereto without departing from the broader spirit and scope of the invention. For example, although references are made to data models, other types of models can be managed using the techniques described herein. For another example, although references are made to running a SQL statement against a table containing the model information, other types of data containers and other languages may be used to manage data models. For yet another example, references are made to models comprising objects in an object-oriented system. However, fundamental programming constructs other than object-oriented objects may be used to describe a model and form the basis of lightweight model information as described herein. Therefore, the specification and drawings are, accordingly, to be regarded in an illustrative rather than a restrictive sense.

In addition, in this description certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

---

APPENDIX A

Example of a routine for computing difference graph and storing results:
------------------------------------------------------START--------------------------------------------------------

```
/**
* This function computes different between srcLabel (for e.g. A) and targetLabel (for e.g. B).
*/
FUNCTION compareLabel(srcLabel IN VARCHAR2, targetLabel IN VARCHAR2)
RETURN NUMBER IS
    vSrcSnapshotID lwcontext.SnapshotID%TYPE;
    vTargetSnapshotID lwcontext.SnapshotID%TYPE;
    comparisonID NUMBER(9);
    sql_stmt VARCHAR2(1000);
BEGIN
    -- make sure it is fresh start of compare action.
    cleanSourceTargetComponent();
    -- get snapshot ids corresponding to snapshot names.
    sql_stmt := 'select snapshotID from snapshotlookup' where SnapshotName = :snaplabel';
    -- Source Snapshot ID
    execute immediate sql_stmt INTO vSrcSnapshotID USING srcLabel;
    -- Target Snapshot ID.
    execute immediate sql_stmt INTO vTargetSnapshotID USING targetLabel;
    -- Gets Snapshot A's Contents into SourceComponent.
    initComponentLabel(vSrcSnapshotID, 'SourceComponent');
    -- Gets Snapshot B's contents into TargetComponent.
    initComponentLabel(vTargetSnapshotID,'TargetComponent');
    -- Following two statements computes A minus B; and B minus A.
    findDelta(COMPARE_LABEL_ID, vSrcSnapshotID, COMPARE_DELETE_STATE,
        'SourceComponent', 'TargetComponent');
            findDelta(COMPARE_LABEL_ID, vTargetSnapshotID, COMPARE_INSERT_STATE,
        TargetComponent', 'SourceComponent');
    -- Following computes objects with different metadata signatures.
    findUpdate(COMPARE_LABEL_ID, vTargetSnapshotID, TRANSIENT_SNAPSHOT);
    return SUCCESS;
END compareLabel;
PROCEDURE findDelta(comparisonID IN NUMBER, snapID IN NUMBER,
        compare_state IN NUMBER, srcTable IN VARCHAR2, tgtTable IN VARCHAR2) IS
    sql_stmt VARCHAR2(4000);
    insert_stmt VARCHAR2(300);
    select_stmt VARCHAR2(300);
    from_stmt VARCHAR2(3400);
    filter_stmt VARCHAR2(1000);
    BEGIN
      insert_stmt :=
      'INSERT INTO CompareGraphStoreTable' ||
        ' (CompareID, diffcol, assocCol, uoid, role, physicalName, logicalName,
          className, CompareDML, objType, assocUOID, assocRole, assocPhysName,
          assocLogName, assocClassName, assocState, assocType, otherUOID) (';
        select_stmt := ' select ' || comparisonID || ', B.diffCol, B.assocCol,
          B.uoid, B.role, B.physicalName, B.logicalName, B.className, '
          || compare_state || ', B.objType, B.assocUOID, B.assocRole,
          B.assocPhysName, B.assocLogName, B.assocClassName, B.assocState, B.assocType,
    B.otherUOID';
        from_stmt := ' from
          (select t1.diffCol, t1.assocCol, t2.uoid uoid1, t1.uoid, t1.role,
```

-continued

APPENDIX A

```
              t1.physicalName, t1.logicalName, t1.className, t1.objType,
              t1.assocUOID, t1.assocRole, t1.assocPhysName, t1.assocLogName,
              t1.assocClassName, t1.assocState, t1.assocType, t1.otherUOID'
        || ' from
        (select diffCol, assocCol, uoid,
                decode(role,null, ' || '''null''' || ',role) role,
                physicalName, logicalName, className, objType, assocUOID,
                decode(assocRole,null,' || '''null''' || ',assocRole) assocRole,
                assocPhysName, assocLogName, assocClassName, ' || SAME || ' assocState,
                assocType, uoid otherUOID
           from ' || srcTable || ' ) t1,
        (select diffCol, assocCol, uoid,
                decode(role,null, ' || '''null''' || ',role) role,
                decode(assocRole,null,' || '''null''' || ',assocRole) assocRole,
                assocType
           from ' || tgtTable ||') t2
           where t1.diffCol = t2.diffCol(+) and
                t1.role = t2.role(+) and
                t1.assocRole = t2.assocRole(+) and
                t1.assocType = t2.assocType(+)
        )B ';
      filter_stmt :=' where B.uoid1 is null) ';
      sql_stmt := insert_stmt || select_stmt || from_stmt || filter_stmt;
      debug('Snapshot.findDelta: sql_stmt = ',sql_stmt);
      EXECUTE IMMEDIATE sql_stmt;
  END findDelta;
PROCEDURE findUpdate(comparisonID IN NUMBER, tgtID IN NUMBER) IS
    sql_stmt VARCHAR2(5000);
    insert_stmt VARCHAR2(500);
    select_stmt VARCHAR2(500);
    from_stmt VARCHAR2(3000);
    filter_stmt VARCHAR2(1000);
    BEGIN
      insert_stmt :='INSERT INTO CompareGraphStoreTable' ||
            '(compareID, diffcol, assocCol, uoid, role, physicalName, logicalName, className,
            compareDML, signstate, objType, assocUOID, assocRole, assocPhysName, assocLogName,
            assocClassName, assocState, assocType, otheruoid) (';
      select_stmt :=' select ' || comparisonID || ',' || ' A.diffCol, A.assocCol
            A.elUOID, A.role, A.physicalName, A.logicalName, A.className,'
            || COMPARE_UPDATE_STATE || ', A.signState, A.objType, A.assocUOID,
            A.assocRole, A.assocPhysName, A.assocLogName,
            A.assocClassName, A.assocState, A.assocType, A.otheruoid ' ;
      from_stmt :=
        ' from
        (select
            t1.diffCol, t1.assocCol, t1.uoid elUOID, t1.role, t1.physicalName,
            t1.logicalName, t1.className,
            decode (t2.metadatasignature,t1.metadatasignature, ' || SAME || ',' || DIFFERENT || ') signstate,
            t1.objType, t1.assocUOID, t1.assocRole, t1.assocPhysName, t1.assocLogName,
            t1.assocClassName,
            decode (t2.assocCol,t1.assocCol,' || SAME || ',' || DIFFERENT || ') assocState,
            t1.assocType, decode (t1.assocType, 0, t2.uoid, t2.assocUOID) otherUOID
          from (select diffCol,
                decode(assocCol, null, ' || '''null''' || ', assocCol) assocCol,
                uoid,
                decode(role,null,' || '''null''' || ',role) role,
                physicalName, logicalName, className,
                metadatasignature, objType, assocUOID,
                decode(assocRole,null,' || '''null''' || ',assocRole) assocRole,
                assocPhysName, assocLogName, assocClassName, assocType
                from TargetComponent) t1,
          (select diffCol,
                decode(assocCol, null,' || '''null''' || ', assocCol) assocCol,
                uoid, assocUOID,
                decode(role,null,' || '''null''' || ',role) role,
                metadatasignature,
                decode(assocRole,null, ' || '''null''' || ',assocRole) assocRole,
                assocType
                from SourceComponent) t2
           where t1.diffCol is not null and
                t2.diffCol is not null and
                t1.diffCol = t2.diffCol and
                t1.role = t2.role and
                t1.assocRole = t2.assocRole and
                t1.assocType = t2.assocType
        ) A ';
      filter_stmt := ' where A.elUOID is not null and
```

-continued

APPENDIX A

```
    (
        A.signstate = ' || DIFFERENT || ' or
        A.assocState = ' || DIFFERENT || ' ) ) ';
    sql_stmt := insert_stmt || select_stmt || from_stmt || filter_stmt;
    EXECUTE IMMEDIATE sql_stmt;
END findUpdate;
-------------------------------------------------------END-------------------------------------------
```

What is claimed is:

1. A method for managing changes to a data model, the method comprising the computer-implemented steps of:

generating a first set of signatures for a first version of the data model, the first set of signatures representing semantics of objects in the first version of the data model;

generating a second set of signatures for a second version of the data model, the second set of signatures representing semantics of objects in the second version of the data model; and determining whether differences exist between the first version of the data model and the second version of the data model based, at least in part, on a comparison of the first set of signatures and the second set of signatures.

2. The method of claim 1, wherein the step of determining whether differences exist between the first and second versions includes determining that a signature associated with a specific object in the first version is different than a signature associated with a corresponding object in the second version.

3. The method of claim 1, wherein each of the signatures in the first and second sets of signatures corresponds to a specific object in the corresponding first and second versions of the data model, and wherein each of the signatures is generated based on metadata associated with a corresponding object.

4. The method of claim 1, wherein each of the signatures in the first and second sets of signatures corresponds to a specific object in the corresponding first and second versions of the data model, and wherein each of the signatures is generated by inputting into a hash function the metadata associated with the corresponding object, and wherein the hash function outputs the signature for the corresponding object.

5. The method of claim 4, wherein the hash function is a two-way hash function, the method further comprising the computer-implemented step of:

deconstructing the signature for a specific object, using the hash function, to determine semantic information about the specific object.

6. The method of claim 1, further comprising the computer-implemented steps of:

generating a unique object identifier for each of the objects in the first version of the data model; and generating a unique object identifier for each of the objects in the second version of the data model.

7. The method of claim 6, further comprising the computer-implemented step of:

determining whether an object is in one of and not the other of the first and second versions of the data model based on a comparison of the object identifiers for the objects in the first version and the object identifiers for the objects in the second version.

8. The method of claim 1, further comprising the computer-implemented steps of:

generating a unique object identifier for each of the objects in the first version of the data model;

representing one or more relationships associated with each of the objects in the first version of the data model, wherein a relationship is between two objects;

generating a unique object identifier for each of the objects in the second version of the data model;

representing one or m or e relationships associated with each of the objects in the second version of the data model; and determining whether differences exist between the first version of the data model and the second version of the data model further based on a comparison of the object identifiers for the objects in the first version and the object identifiers for the objects in the second version.

9. The method of claim 8, wherein the step of determining whether differences exist between the first version of the data model and the second version of the data model is further based on a comparison of the relationships associated with each of the objects in the first version of the data model and the relationships associated with each of the objects in the second version of the data model.

10. The method of claim 9, wherein the step of determining whether differences exist between the first and second versions includes determining that a relationship associated with a specific object in the first version is different than a relationship associated with a corresponding object in the second version.

11. The method of claim 8, further comprising the computer-implemented step of:

storing the signatures, object identifiers and relationships associated with the first and second versions in a relational database system.

12. The method of claim 8, wherein the signatures, object identifiers and relationships associated with the first and second versions are stored in one or more relational data tables, and wherein the step of determining whether differences exist includes executing a SQL statement on the one or more tables.

13. The method of claim 1, further comprising the computer-implemented step of:

storing metadata associated with the first version of the data model;

storing metadata associated with the second version of the data model; and upon determining that differences exist between the first and second versions, determining what is different between the first and second versions by analyzing the stored metadata associated with the first and second versions.

14. The method of claim 1, further comprising the computer-implemented steps of:
   upon determining that differences exist between the first and second versions, generating a delta object that represents at least some of the differences between the first and second versions.

15. The method of claim 14, further comprising the computer-implemented steps of:
   constructing an instance of the second version of the data model by applying the delta object to an instance of the first version of the data model.

16. The method of claim 14, wherein a first instance of the data model and a second instance of the data model are both initially based on the first version of the data model, and wherein differences exist between the second instance and the first instance, the method further comprising the computer-implemented step of:
   constructing a modified second instance based on the second version by applying the delta object to the second instance while retaining the differences between the second instance and the first instance.

17. A method for managing changes to a data model, the method comprising the computer-implemented steps of:
   generating a first set of signatures for a first version of the data model, the first set of signatures representing semantics of objects in the first version of the data model;
   generating a second set of signatures for a second version of the data model, the second set of signatures representing semantics of objects in the second version of the data model;
   generating a unique object identifier for each of the objects in the first version of the data model;
   representing one or more relationships associated with each of the objects in the first version of the data model, wherein a relationship is between two objects;
   generating a unique object identifier for each of the objects in the second version of the data model;
   representing one or more relationships associated with each of the objects in the second version of the data model;
   generating a signature for the first version of the data model based on the set of signatures for the first version and the relationships associated with the objects in the first version;
   generating a signature for the second version of the data model based on the set of signatures for the second version and the relationships associated with the objects in the second version; and
   determining whether the first version and the second version of the data model are different by comparing the signatures for the first and second versions.

18. The method of claim 17, further comprising the steps of:
   upon determining that differences exist between the first and second versions, determining that a specific object is different in the first and second versions by comparing the object identifiers, signatures and relationships of the objects in the first and second versions.

19. The method of claim 18, further comprising the computer-implemented steps of:
   storing metadata associated with the first version of the data model;
   storing metadata associated with the second version of the data model; and
   upon determining that a specific object is different in the first and second versions, determining what is different by analyzing the stored metadata associated with the first and second versions.

20. A computer-readable medium carrying one or more sequences of instructions which, when executed by one or more processors, causes the one or more processors to perform the method recited in claim 1.

21. A computer-readable medium carrying one or more sequences of instructions which, when executed by one or more processors, causes the one or more processors to perform the method recited in claim 2.

22. A computer-readable medium carrying one or more sequences of instructions which, when executed by one or more processors, causes the one or more processors to perform the method recited in claim 3.

23. A computer-readable medium carrying one or more sequences of instructions which, when executed by one or more processors, causes the one or more processors to perform the method recited in claim 4.

24. A computer-readable medium carrying one or more sequences of instructions which, when executed by one or more processors, causes the one or more processors to perform the method recited in claim 5.

25. A computer-readable medium carrying one or more sequences of instructions which, when executed by one or more processors, causes the one or more processors to perform the method recited in claim 6.

26. A computer-readable medium carrying one or more sequences of instructions which, when executed by one or more processors, causes the one or more processors to perform the method recited in claim 7.

27. A computer-readable medium carrying one or more sequences of instructions which, when executed by one or more processors, causes the one or more processors to perform the method recited in claim 8.

28. A computer-readable medium carrying one or more sequences of instructions which, when executed by one or more processors, causes the one or more processors to perform the method recited in claim 9.

29. A computer-readable medium carrying one or more sequences of instructions which, when executed by one or more processors, causes the one or more processors to perform the method recited in claim 10.

30. A computer-readable medium carrying one or more sequences of instructions which, when executed by one or more processors, causes the one or more processors to perform the method recited in claim 11.

31. A computer-readable medium carrying one or more sequences of instructions which, when executed by one or more processors, causes the one or more processors to perform the method recited in claim 12.

32. A computer-readable medium carrying one or more sequences of instructions which, when executed by one or more processors, causes the one or more processors to perform the method recited in claim 13.

33. A computer-readable medium carrying one or more sequences of instructions which, when executed by one or more processors, causes the one or more processors to perform the method recited in claim 14.

34. A computer-readable medium carrying one or more sequences of instructions which, when executed by one or more processors, causes the one or more processors to perform the method recited in claim 15.

35. A computer-readable medium carrying one or more sequences of instructions which, when executed by one or more processors, causes the one or more processors to perform the method recited in claim 16.

36. A computer-readable medium carrying one or more sequences of instructions which, when executed by one or more processors, causes the one or more processors to perform the method recited in claim 17.

37. A computer-readable medium carrying one or more sequences of instructions which, when executed by one or more processors, causes the one or more processors to perform the method recited in claim 18.

38. A computer-readable medium carrying one or more sequences of instructions which, when executed by one or more processors, causes the one or more processors to perform the method recited in claim 19.

39. An apparatus for managing changes to a data model, the apparatus comprising:

means for generating a first set of signatures for a first version of the data model, the first set of signatures representing semantics of objects in the first version of the data model;

means for generating a second set of signatures for a second version of the data model, the second set of signatures representing semantics of objects in the second version of the data model; and means for determining whether differences exist between the first version of the data model and the second version of the data model based, at least in part, on a comparison of the first set of signatures and the second set of signatures.

* * * * *